United States Patent [19]

Becker

[11] Patent Number: 5,613,570
[45] Date of Patent: Mar. 25, 1997

[54] SUSPENSION SYSTEM FOR SNOWMOBILE SEAT

[76] Inventor: Gary Becker, 693 Highway S, Hartford, Wis. 53027

[21] Appl. No.: 427,304

[22] Filed: Apr. 24, 1995

[51] Int. Cl.$^6$ .................................................. B62J 1/04
[52] U.S. Cl. ................... 180/190; 114/363; 267/131; 297/199
[58] Field of Search ................ 180/190; 280/275, 280/283, 845; 114/363; 267/64.11, 64.17, 64.16, 64.28, 131, 132, 133; 297/199, 200; 248/636, 560, 581

[56] References Cited

U.S. PATENT DOCUMENTS

| | | | |
|---|---|---|---|
| 2,702,088 | 2/1955 | Klimer | 180/190 |
| 2,961,033 | 11/1960 | Galbraith | 297/199 |
| 3,599,956 | 8/1971 | Harder | 267/131 |
| 3,736,020 | 5/1973 | Pilachowski et al. | 267/131 |
| 4,632,355 | 12/1986 | Thomas | 248/584 |
| 4,946,145 | 8/1990 | Kurabe | 269/131 |
| 5,376,978 | 11/1994 | Mardikian | 267/131 |

*Primary Examiner*—Anne Marie Boehler
*Attorney, Agent, or Firm*—Ryan, Maki, Mann & Hohenfeldt

[57] ABSTRACT

A snowmobile seat suspension includes a seat support member pivotally connected at its front end to the chassis of a snowmobile, a yieldable support member supporting the rear of the seat support member and at least one air cylinder yieldable in a downward direction but damping in the upward direction. The air cylinder is connected to an inlet hose having a length of 1 to 6 inches, the hose containing a one-way valve which allows air to enter the cylinder without restriction but restricts outflow of air from the cylinder.

8 Claims, 3 Drawing Sheets

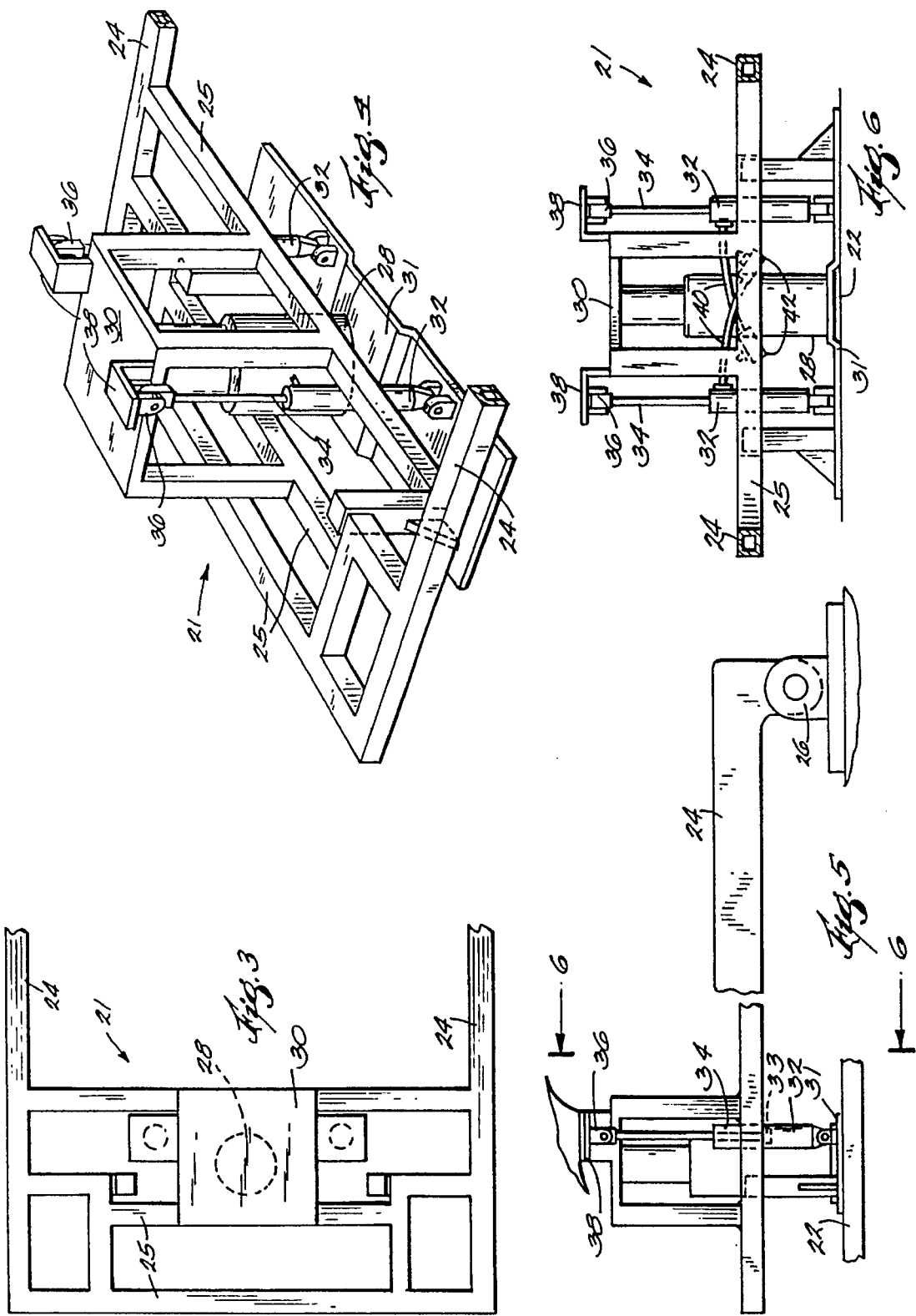

5,613,570

SUSPENSION SYSTEM FOR SNOWMOBILE SEAT

FIELD OF THE INVENTION

The present invention relates generally to suspension systems for vehicles. More specifically the invention relates to a seat suspension for a seat of the type usually straddled by the driver on self-propelled vehicles such as a snowmobile or a jet-driven watercraft.

BACKGROUND OF THE INVENTION

Seat suspensions for self-propelled vehicles such as snowmobiles have commonly included a seat that is pivotally connected at its forward end to the snowmobile frame and is supported at its rear end by a resilient suspension mechanism. Various types of air cushions and springs have been used to provide such suspensions.

Due to the fact that snowmobiles are frequently driven on irregular terrain and sometimes over obstacles that are not clearly visible through snow, it is necessary for the seats of such vehicles to provide a satisfactory protective shock absorbing capability. Improvements in such suspension systems continue to be needed because of the trauma that can be caused to the spine of a rider by the shocks transmitted from the seat to the rider's torso.

One problem that has occurred is that resilient means, for example air cushions, that provide a great deal of cushioning of a downwards thrust by the driver's torso into the seat will compress with a great deal of stored force. This force is then rapidly relieved shortly after the shock experienced by the vehicle and rider, to the extent that the rides s torso can be thrust upwardly with great force which may even throw the driver from the vehicle. A similar phenomenon can occur with self-propelled water craft upon falling of the vehicle from the crest of a wave to a trough. A need, thus, exists for an improved seat suspension system for vehicles such as snowmobiles, water craft, etc., particularly of the type designed to be operated by a single driver carrying, occasionally, no more than one passenger.

SUMMARY OF THE INVENTION

It is a principal object of the invention to provide an improved snowmobile seat suspension system. In accordance with one aspect of the invention a yieldable support member such as a compressible spring or air cylinder supports the rear of a seat support member for a snowmobile while a device is combined therewith which dampens or slows down the rebounding effect of the yieldable support member.

In accordance with a related aspect of the invention, the damping device provides a controllable resistance to rebound shocks. In accordance with this aspect, the resistance can be adjusted by the operator to suit his weight and the anticipated travel conditions. In accordance with a still further related aspect of the invention, the damping device is formed by at least one, and preferably two, air cylinders which are also attached to the rear portion of the seat support system.

In accordance with the invention, the movement of the seat is damped in the upward direction, and the air cylinder or other damping device is more freely yieldable in the downward direction. In accordance with this aspect, such damping of upward rebounding movement of the seat after application thereto of a compressive shock helps to prevent trauma to the snowmobile rider's torso caused by rapid rebounding after the suspension is compressed by a hard jolt experienced due to impact of the vehicle drive mechanism against another surface.

In accordance with yet a further aspect of the invention, the air cylinder is preferably provided with a one-way flow-restricting valve which permits air to enter the cylinder when the seat suspension is being compressed but restricts outflow of air from the cylinder when the compressive pressure is relieved. In accordance with yet a further aspect the one-way valve is contained at the end of a hose having a length of approximately 1 to 6 inches, and preferably 2 to 2.5 inches, which provides a volume of air outside of the cylinder sufficient to provide damping of the rebound motion through air compression utilizing an air cylinder of smaller volume than would otherwise be required.

In accordance with yet another aspect of the invention, two air cylinders can be coupled to a single flow-restrictive valve by means of hoses connected to the valve through a "T" or "Y" coupling.

Briefly, the invention provides a snowmobile seat suspension which includes a seat support member pivotally connected at its front end to the chassis of a snowmobile, a yieldable support member supporting the rear of the seat support member and at least one air cylinder yieldable in a downward direction but damping in the upward direction. The air cylinder is connected to an inlet hose having a length of 1 to 6 inches, the hose containing a one-way valve which allows air to enter the cylinder without restriction but restricts outflow of air from the cylinder.

In a yet further aspect of the invention, damping mechanisms are also attached to the forward connection of the suspension to thereby minimize forward/rearward jolts which may have a tendency to throw the driver from the machine.

Further objects and advantages of the invention will become apparent from the following detailed description and accompanying drawings and claims.

BRIEF DESCRIPTION OF THE DRAWINGS

FIG. 4 is a perspective view showing the components of FIG. 3;

FIG. 5 is a fragmentary side elevational view of the working components of the seat suspension of the present invention;

FIG. 6 is a sectional view taken along line 6—6 of FIG. 5;

FIG. 7 is a semi-schematic view with a cylinder in cross-section showing the suspension damping mechanism in accordance with the invention;

DETAILED DESCRIPTION

Figure 1:
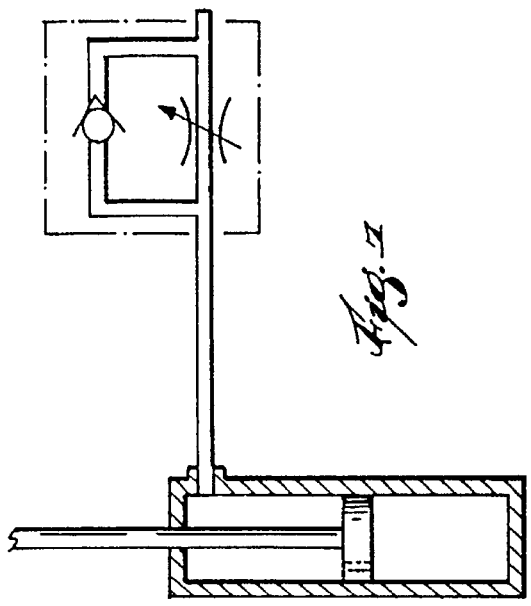
FIG. 1 is a side view showing a seat in accordance with the invention installed on a snowmobile.
Figure 2:
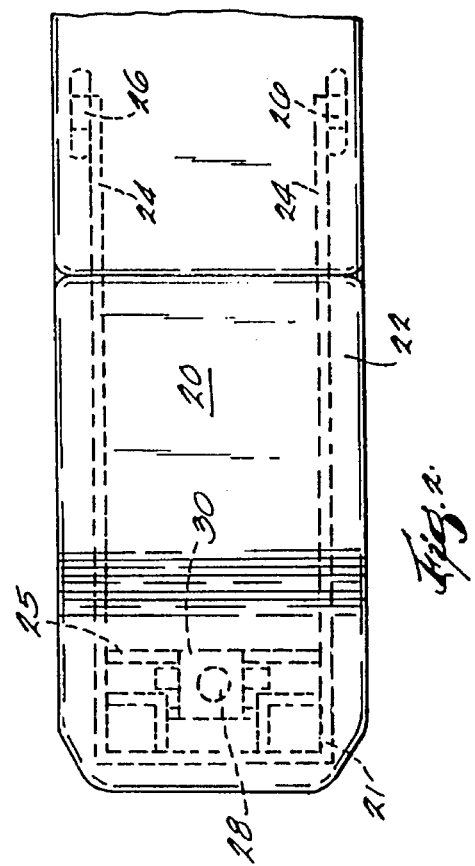
FIG. 2 is a fragmentary top view of the seat of the present invention with interior parts showed by phantom lines.
Figure 3:
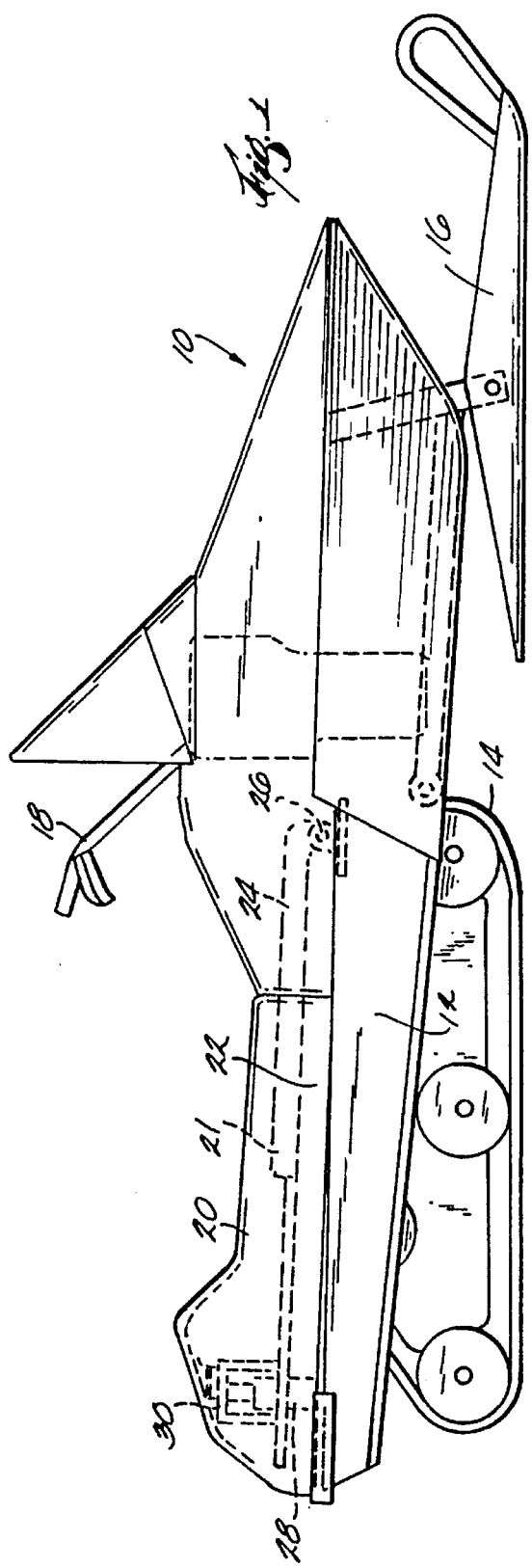
FIG. 3 is a fragmentary top plan view of the seat rear suspension components in accordance with the invention.

Referring more particularly to the drawings, a snowmobile 10 is illustrated in FIG. 1. Snowmobile 10 includes a chassis tunnel 12 and a drive-track mechanism 14 as well as front skis 16 steerable by a steering mechanism which is operated by handle bars 18.

A cushioned seat 20 is provided to support one or more riders on the snowmobile 10. A top surface 22 of the chassis tunnel 12 supports forward end of seat support suspension 21 by means of hinges and brackets 26. Suspension 21 includes a pair of side rails 24 and a plurality of cross members 25 which together form a generally rectangular framework.

A shock absorber 28 which may be in the form of an enclosed air cushion, in the preferred embodiment, or alternately may be a spring or a combination of resilient devices supports the rear of the suspension 21.

In the illustrated embodiment, the air cushion 28 is compressed somewhat by the weight of a rider and is capable of further compression when the snowmobile is impacted so as to provide a cushioning of vertically applied compressive shocks. The upper end of air cushion 28 abuts against a flange 30 supported by the seat suspension framework. The lower end of air cushion 28 is supported on another flange 31 which is in turn supported by the upper surface of chassis tunnel 22.

As best seen in FIGS. 4–6, a pair of air cylinders 32 also connect the rear of seat suspension system 21 with the top of chassis tunnel 22. In the illustrated embodiment one of the cylinders 32 is located on each side of the suspension laterally of air cushion 28. Each cylinder 32 contains an airtight piston 33 which is affixed to a piston rod 34. Piston rods 34 are connected pivotally to brackets 36 which are supported on flanges 38 which in turn are supported on the framework of suspension 21.

Each of the cylinders 32 is connected by an inlet at its upper end to a flexible hose or conduit 40. The outer ends of hoses 40 are provided with one-way valves 42. Valves 42 are oriented so that air can be freely drawn into the tops of cylinders 32 through hoses 40 but air can not be readily expelled through one-way valves 42. Preferably each one-way valve 42 is formed with an orifice of adjustable size. The cylinders thereby act so as to permit downward movement of suspension 21 but dampen the return upward movement thereof due to the air flow resistance through valves 42. Valves 42 are provided with small openings that allow a more gradual upward recovery of the suspension and hence seat 20. It has, thus, been found that shocks to the spine and torso of the rider of snowmobile 10 are minimized by elimination of upward rebounding of seat 20 after a sharp downward compression thereof. The ride characteristics of snowmobile seat 20 are, thus, caused to provide a smoother ride.

It has been found that the air contained in the upper end of cylinder 32 when compressed as well as the air contained in hoses 40 serves to act as an upward cushioning device due to compression of the air contained therein upon receiving an upward or rebound shock as the snowmobile recovers from a heavy downward force for example when hitting a bump. In order to optimize this cushioning effect it has been found that optimum results are obtained when hoses 40 are between 1 inch and 6 inches, and most preferably 2.5 inches in length. Such length of hose apparently provides optimum cushioning or dissipation of energy from the upwardly rebounding suspension in the case of hoses having an internal lumen approximately ⅛ inch in diameter. Alternatively, if desired, a volume of compressible air can be enclosed in a small chamber attached to the side of the cylinder.

Figure 8:
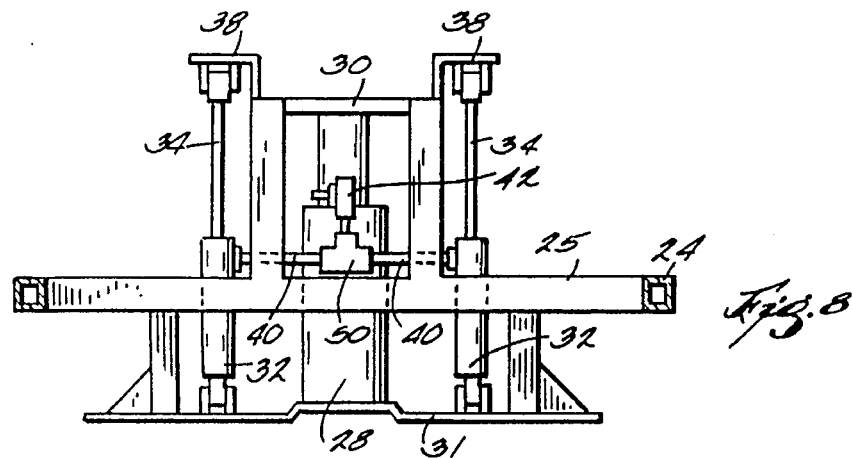
FIG. 8 is a rear view of a suspension incorporating a further embodiment of the invention.

In the modified and preferred embodiment shown in FIG. 8 both hoses 42 are connected to a T-shaped fitting 50 which in turn is connected to a single one-way valve 42. With this embodiment the pressures exerted on each of the cylinders 32 is equalized. Also, the hoses and valves are better maintained in position to avoid rattling etc. Finally this embodiment enables a cost reduction for the assembly. Instead of a T-shaped member 50, as shown, a Y-shaped fitting could be used, instead. In other respects the embodiment of FIG. 8 is similar to that shown in FIGS. 1–7.

Figure 9:
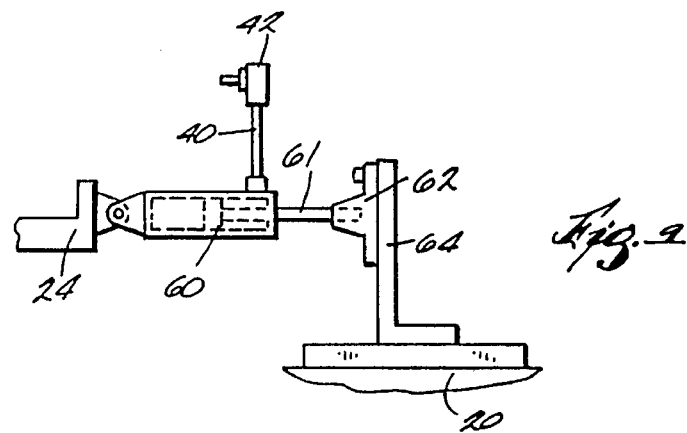
FIG. 9 is fragmentary side view showing a modified front suspension connection to a snowmobile; and, FIG. 10 a side view of a watercraft incorporating the invention with interior parts shown by phantom lines.

Referring to FIG. 9 there is shown an alternate means to connect the forward end 24 of the suspension 21 to the floor of chassis tunnel 20. For this embodiment a cylinder 60 is provided at the forward end of each of the side frame members 24. A piston rod 60 is attached to a flange 62, preferably formed of a flexible elastomeric material which serves to dampen vibrations between suspension 24 and chassis 20. Flange 62 may be mounted on a bracket 64 as shown which in turn is secured to the chassis 20. A valve 42 is attached to cylinder 60 either by means of a hose 40 as shown or alternatively valve 42 can be directly attached to the side of cylinder 60. In addition to the reduction of vibration, the arrangement shown in FIG. 9 reduces a tendency of a snowmobile seat in extreme riding conditions to throw the driver forward when a jolt is encountered. The cylinder 60 in this case serves to dampen backward and forward movement to avert such occurrence.

Figure 10:
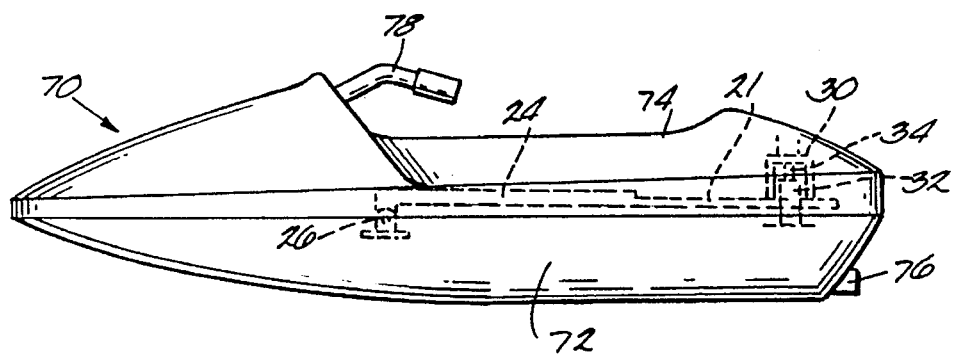

Referring to FIG. 10 there is seen a water craft 70 having a chassis 72 on which a seat 74 is mounted. Water craft 70 is propelled by a jet of water expelled through a rearward facing outlet pipe 76 and is steered by means of a handlebar 78 projecting over seat 74. FIG. 10 shows the mounting between seat 74 and chassis 72 of a suspension 21 of this invention. The numerals referring to parts that are used in common with the snowmobile chassis described in FIGS. 1–8 refer to like parts. The use of suspension 21 in a water craft 70 performs similarly to that of the similar chassis above described in connection with snowmobile 10.

While preferred embodiments of the invention have been described herein it will be understood that the exact details thereof may be modified by those skilled in the art, it will, thus, be understood that the scope of the invention is limited only by the following claims and reasonable equivalents thereof.

What is claimed is:

1. A seat suspension for a self-propelled vehicle comprising:

a seat support member having a front position and a rear portion, adapted to be pivotally connected at its front to the chassis of said vehicle, a seat supported on said seat support member, a yieldable support member supporting the rear of said seat support member at least one damping device readily yieldable in a downward direction but damping the rebounding thereof in an upward direction, connecting the rear of said seat support to the chassis of said vehicle, said damping device comprising an air cylinder connected to a one-way valve which allows air to enter said cylinder without restriction but restricts outflow of air from said cylinder.

2. A seat suspension according to claim 1 wherein said cylinder is connected to said valve by a connecting hose having a length of 1 to 6 inches.

3. A suspension according to claim 1 wherein said valve comprises an orifice of adjustable size.

4. A suspension according to claim 1 wherein said yieldable support member comprises an enclosed chamber filled with compressible air.

5. A seat suspension according to claim 1 wherein said self-propelled vehicle comprises a snowmobile.

6. A suspension according to claim 1 wherein said self propelled vehicle comprises a jet propelled water craft.

7. A suspension according to claim 1 wherein said damping device comprises a pair of cylinders one positioned on each side of said seat laterally from the center line of the vehicle and each cylinder is provided with a hose connected to a single one-way valve by means of a fluid flow fitting.

8. A suspension according to claim 7 wherein said fitting comprises a T-shaped fitting connecting both of said hoses to said valve.

\* \* \* \* \*